United States Patent
Iwata et al.

(10) Patent No.: US 8,866,342 B2
(45) Date of Patent: Oct. 21, 2014

(54) POWER CONVERTING APPARATUS

(75) Inventors: Akihiko Iwata, Tokyo (JP); Takeshi Oi, Tokyo (JP); Masato Koyama, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 1006 days.

(21) Appl. No.: 12/922,859

(22) PCT Filed: Mar. 18, 2009

(86) PCT No.: PCT/JP2009/001194
§ 371 (c)(1),
(2), (4) Date: Dec. 7, 2010

(87) PCT Pub. No.: WO2009/116273
PCT Pub. Date: Sep. 24, 2009

(65) Prior Publication Data
US 2011/0089765 A1    Apr. 21, 2011

(30) Foreign Application Priority Data
Mar. 19, 2008  (JP) .................... 2008-070831

(51) Int. Cl.
*H02J 1/00*      (2006.01)
*H02M 7/49*      (2007.01)
*H02M 7/501*     (2007.01)
*H02M 1/00*      (2006.01)

(52) U.S. Cl.
CPC .............. *H02M 7/49* (2013.01); *Y02B 70/1483* (2013.01); *H02M 7/501* (2013.01); *H02M 2001/0077* (2013.01)
USPC ........................................................ 307/82

(58) Field of Classification Search
USPC ........................................................ 307/82
See application file for complete search history.

(56) References Cited

U.S. PATENT DOCUMENTS

| 8,178,940 B2* | 5/2012 | Nakamura et al. ............. 257/473 |
| 2006/0233000 A1 | 10/2006 | Akagi |
| 2008/0303349 A1* | 12/2008 | Gallegos-Lopez et al. ..... 307/75 |

FOREIGN PATENT DOCUMENTS

| JP | 5 211776 | 8/1993 |
| JP | 11 146657 | 5/1999 |
| JP | 3398869 | 2/2003 |
| JP | 2004 147472 | 5/2004 |
| JP | 2005 57937 | 3/2005 |
| JP | 2005 73362 | 3/2005 |
| WO | 00 72433 | 11/2000 |

OTHER PUBLICATIONS

Machine translation of JP 2005-057937 A; Nitori Kenji et al; Keisoku Giken Co Ltd, Mar. 3, 2005.*
Combined Chinese Office Action and Search Report issued Sep. 13, 2012, in Patent Application No. 200980109705.4 (with partial English-language translation).

* cited by examiner

*Primary Examiner* — Jared Fureman
*Assistant Examiner* — Duc M Pham
(74) *Attorney, Agent, or Firm* — Oblon, Spivak, McClelland, Maier & Neustadt, L.L.P.

(57) ABSTRACT

A power converting apparatus includes a first inverter circuit including a high-voltage first DC voltage source and operated at a low frequency using Si IGBTs having a high withstand voltage exceeding 1000 V and a second inverter circuit including a low-voltage capacitor operated by high-frequency PWM using SiC MOSFETs having a low withstand voltage, wherein an AC side of the first inverter circuit is connected in series to an AC side of the second inverter circuit. The power converting apparatus outputs AC power having a prescribed voltage waveform obtained from the sum of voltages generated by the first and second inverter circuits.

16 Claims, 10 Drawing Sheets

POWER CONVERTING APPARATUS

TECHNICAL FIELD

The present invention relates to a power converting apparatus and, more particularly, to an inverter which is usable for high power control applications with reduced power loss.

BACKGROUND ART

As a conventional inverter circuit, there is a below-described switching circuit which is usable for high power control applications with reduced power loss.

The switching circuit includes a series circuit of a silicon (Si) transistor and a non-Si transistor which are connected in series, wherein the Si transistor has a conversion capability of 0.1 kVA to 200 kVA and the non-Si transistor is configured with a silicon carbide (SiC) or gallium nitride (GaN) semiconductor device. Withstand voltage of the entirety of the series circuit can be improved by connecting the two transistors in series as mentioned above and switching loss of the entirety of the series circuit can be reduced by high-speed operation of the non-Si-type transistor (refer to Patent Document 1, for example).

Patent Document 1: International patent application republication No. WO00/72433

DISCLOSURE OF THE INVENTION

Problems to be Solved by the Invention

In the conventional inverter circuit, there could arise a risk of device breakage if an imbalance occurs in voltages divided by the two series-connected transistors. For this reason, it is necessary to set a high withstand voltage for a non-Si metal oxide semiconductor field effect transistor (MOSFET) which is a non-Si transistor in order to increase an input DC voltage while maintaining reliability. This means that there has been a problem that the conventional inverter circuit could not provide high power conversion efficiency as a result of a rapid increase in specific on-resistance and a consequent increase in conduction loss of the entirety of the series circuit if the withstand voltage of the non-Si MOSFET is increased.

This invention has been made to overcome the aforementioned problem and, therefore, it is an object of the present invention to provide a highly efficient power converting apparatus which is usable for high power control applications with reduced power loss.

Means for Solving the Problems

A power converting apparatus according to the present invention includes a first inverter circuit provided with a first DC voltage source and a plurality of Si-based semiconductor devices, and a second inverter circuit provided with a second DC voltage source and a plurality of non-Si-based semiconductor devices, wherein AC side output terminals of the first inverter circuit and AC side output terminals of the second inverter circuit are connected in series, and AC power having a prescribed voltage waveform obtained by combining outputs of the first and second inverter circuits is supplied to a load.

Advantages of the Invention

The power converting apparatus according to the present invention can vary such operating conditions as voltage level and frequency depending on device properties by means of the first inverter circuit provided with the Si-based semiconductor devices and the second inverter circuit provided with the non-Si-based semiconductor devices. This makes it possible to achieve a reduction in power loss of the entirety of the power converting apparatus and obtain high output power.

BEST MODES FOR CARRYING OUT THE INVENTION

First Embodiment

A first embodiment of the present invention is now described below with reference to the drawings.

Figure 1:
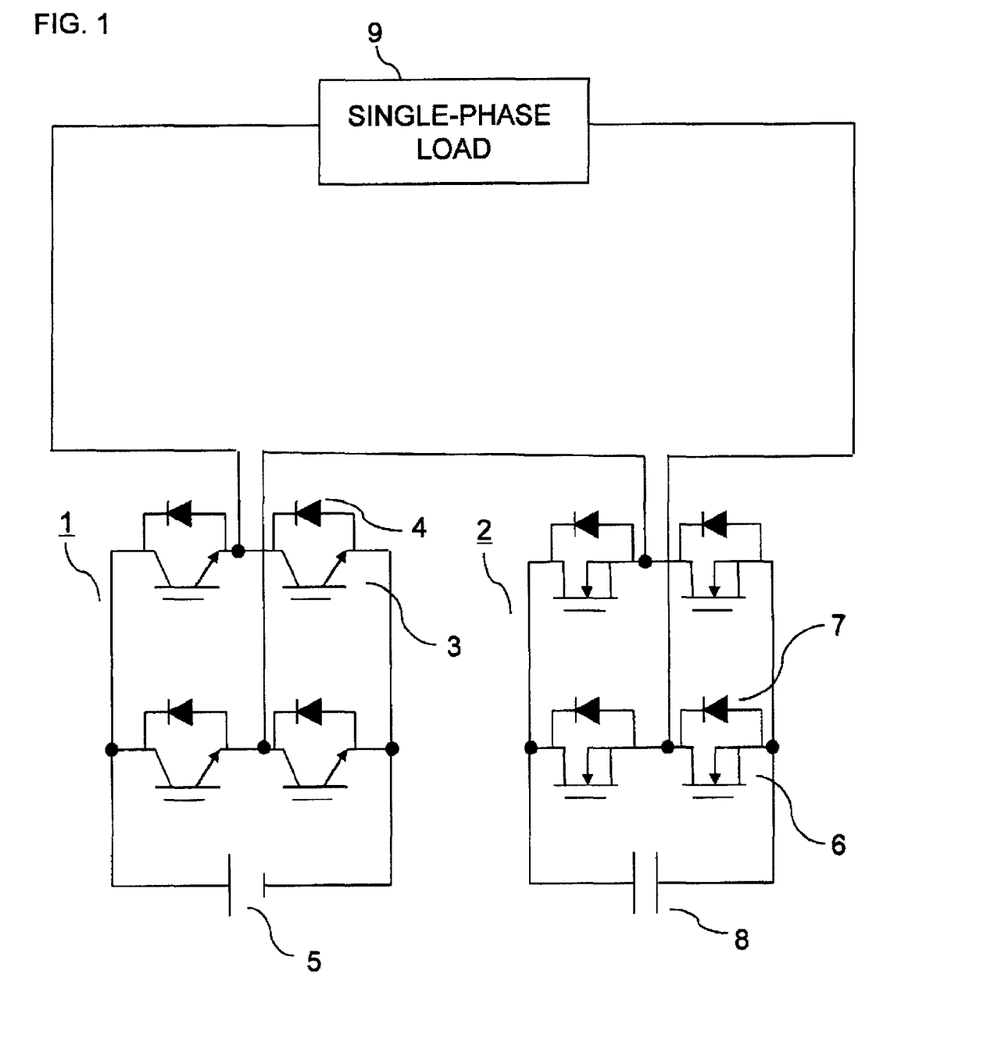
FIG. 1 is a diagram showing the configuration of a power converting apparatus according to a first embodiment of this invention.

FIG. 1 is a diagram showing the configuration of a power converting apparatus according to the first embodiment of this invention. As shown in FIG. 1, the power converting apparatus including a main inverter (first inverter circuit) made up of a first single-phase inverter 1 and a sub-inverter (second inverter circuit) made up of a second single-phase inverter 2 supplies AC power to a single-phase load 9.

Used in the first single-phase inverter 1 are Si-based devices. In this case, the first single-phase inverter 1 is configured with Si IGBTs 3 constituting a plurality of Si semiconductor switching devices with which Si diodes 4 are individually connected in reverse parallel and a first DC power supply 5 serving as a first DC voltage source provided in a DC input portion. The first single-phase inverter 1 thus configured converts DC power fed from the first DC power supply 5 into AC power and outputs the latter. This first single-phase inverter 1 works as an energy source for the single-phase load 9.

Used in the second single-phase inverter 2 are devices made of SiC or GaN, for example, which are non-Si semiconductor materials having wider band gaps than silicon. In this case, the second single-phase inverter 2 is configured with SiC MOSFETs 6 constituting a plurality of non-Si semiconductor switching devices with which SiC Schottky barrier diodes (SiC SBDs) 7 are individually connected in reverse parallel and a capacitor 8 serving as a second DC voltage source provided in a DC input portion. The second single-phase inverter 2 thus configured converts DC power fed from the capacitor 8 into AC power and outputs the latter. Since the DC input portion is provided with the capacitor 8 alone in this case, the second single-phase inverter 2 is controlled such that the amounts of electricity charged into and discharged from the capacitor 8 are balanced, or such that an average power burden born by the second single-phase inverter 2 becomes zero.

Figure 2:
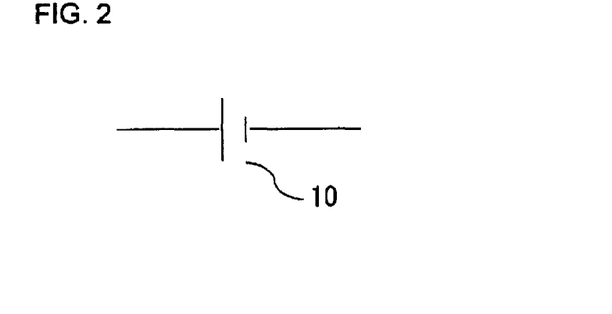
FIG. 2 is a diagram showing a variation of a second DC voltage source according to the first embodiment of this invention.

It is to be noted that a second DC power supply 10 may be used as the second DC voltage source as shown in FIG. 2 and, in this case, the second single-phase inverter 2 also works as an energy source for the single-phase load 9.

Voltage Vdc-main of the first DC power supply 5 of the first single-phase inverter 1 is a high voltage exceeding 1000 V, for example, and this voltage is set higher than voltage Vdc-sub of the capacitor 8 of the second single-phase inverter 2.

The first and second single-phase inverters 1, 2 can generate as outputs thereof positive, negative and zero voltages. The power converting apparatus is configured by connecting AC side output terminals of the first single-phase inverter 1 and AC side output terminals of the second single-phase inverter 2 in series. The voltages generated by the individual single-phase inverters 1, 2 are combined and AC power having a prescribed voltage waveform obtained as the sum of these voltages is supplied to the single-phase load 9. Specifically, the voltage Vdc-main of the first DC power supply 5 and the voltage Vdc-sub of the capacitor 8 are determined to satisfy:

$Vdc$-main$>Vdc$-sub $Vdc$-main$+Vdc$-sub$\geq$maximum load voltage

The working of the first and second single-phase inverters 1, 2 and the entirety of the power converting apparatus is described in the following.

Figure 3:
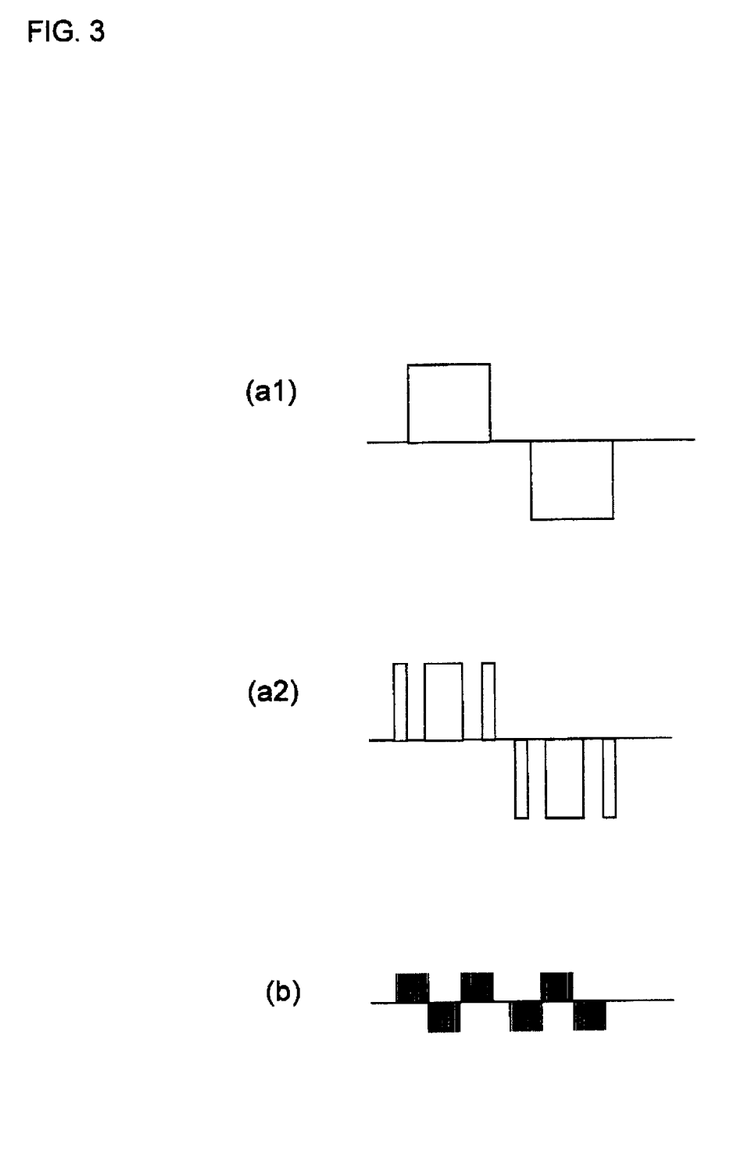
FIG. 3 is a waveform diagram which illustrates output voltages of first and second single-phase inverters according to the first embodiment of this invention.

FIG. 3 is a waveform diagram which illustrates output voltages of the first and second single-phase inverters 1, 2. FIGS. 3($a1$) and 3($a2$) illustrate two kinds of output voltages of the first single-phase inverter 1, FIG. 3($a1$) depicting a case where the first single-phase inverter 1 outputs one pulse each half cycle and FIG. 3($a2$) depicting a case where the first single-phase inverter 1 outputs three pulses each half cycle. FIG. 3($b$) illustrates the output voltage of the second single-phase inverter 2.

As depicted in the Figures, the first single-phase inverter 1 employing the Si IGBTs 3 outputs a voltage waveform containing about one pulse to a few pulses each half cycle. This means that the first single-phase inverter 1 operates by low-frequency switching. On the other hand, the second single-phase inverter 2 employing the SiC MOSFETs 6 operates by switching through high-frequency pulse-width modulation (PWM).

Figure 4:
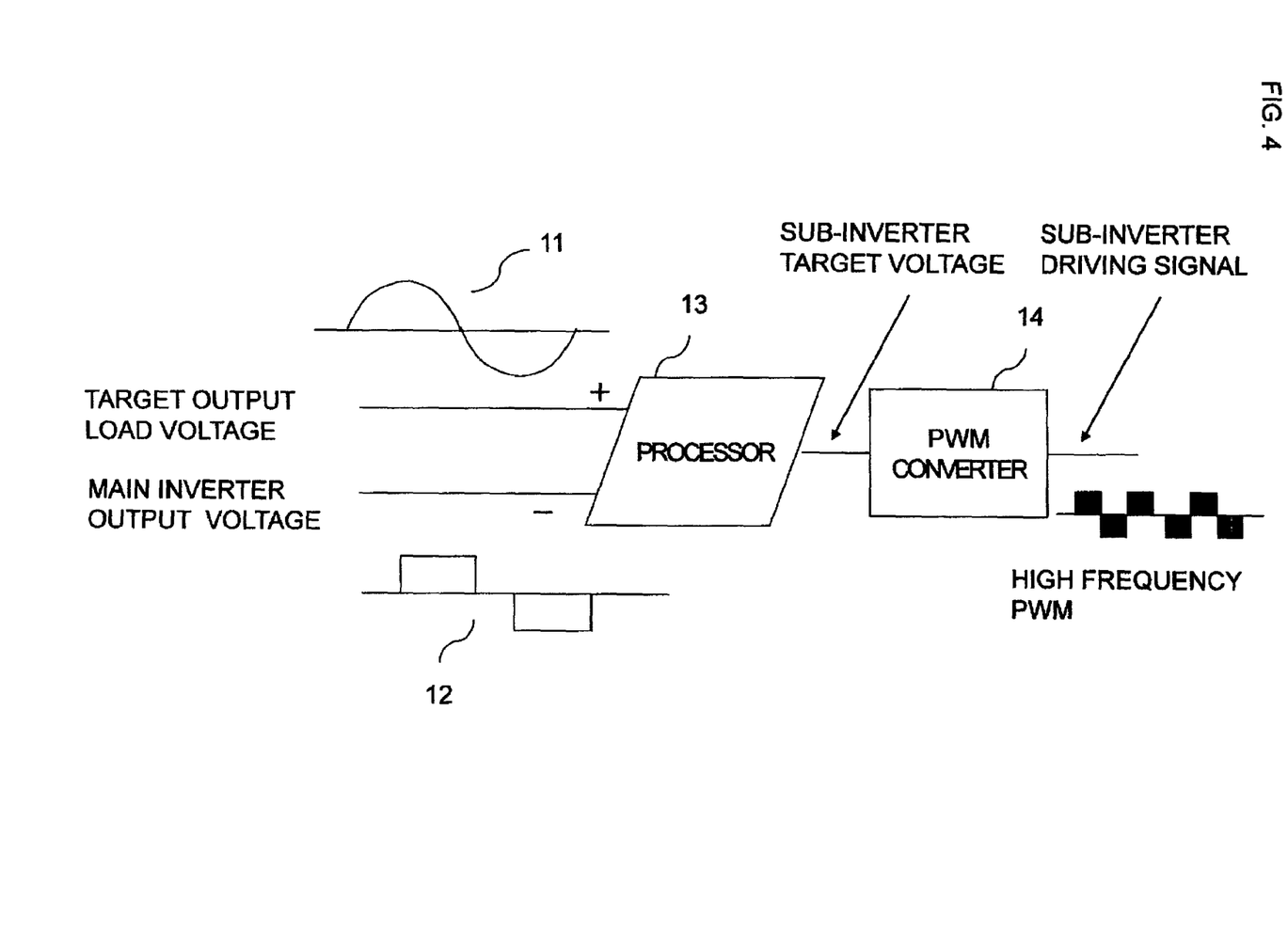
FIG. 4 is a diagram illustrating the working of the entirety of the power converting apparatus according to the first embodiment of this invention.

FIG. 4 is a diagram illustrating the working of the entirety of the power converting apparatus. As depicted in FIG. 4, the power converting apparatus calculates the value of a differential voltage obtained by subtracting the output voltage 12 (main inverter output voltage) of the first single-phase inverter 1 from a target output load voltage 11 of the entirety of the power converting apparatus by a processor 13 and generates a PWM signal (sub-inverter driving signal) for driving the second single-phase inverter 2 through PWM conversion performed by a PWM circuit 14 using the differential voltage value as a target output voltage (sub-inverter target voltage) of the second single-phase inverter 2.

In order to balance the amounts of electricity charged into and discharged from the capacitor 8 of the second single-phase inverter 2 at this time, the output of the first single-phase inverter 1 is controlled in such a manner that the power burden born by the second single-phase inverter 2 per cycle becomes zero.

It is to be noted that what is subtracted from the target output load voltage 11 of the entirety of the power converting apparatus may be a target output voltage of the first single-phase inverter 1 instead of the output voltage 12 of the first single-phase inverter 1.

Given below is a detailed discussion on power loss occurring in the power converting apparatus thus configured associated with a description of properties of the Si IGBTs used in the first single-phase inverter 1 and the SiC MOSFETs used in the second single-phase inverter 2.

Figure 5:
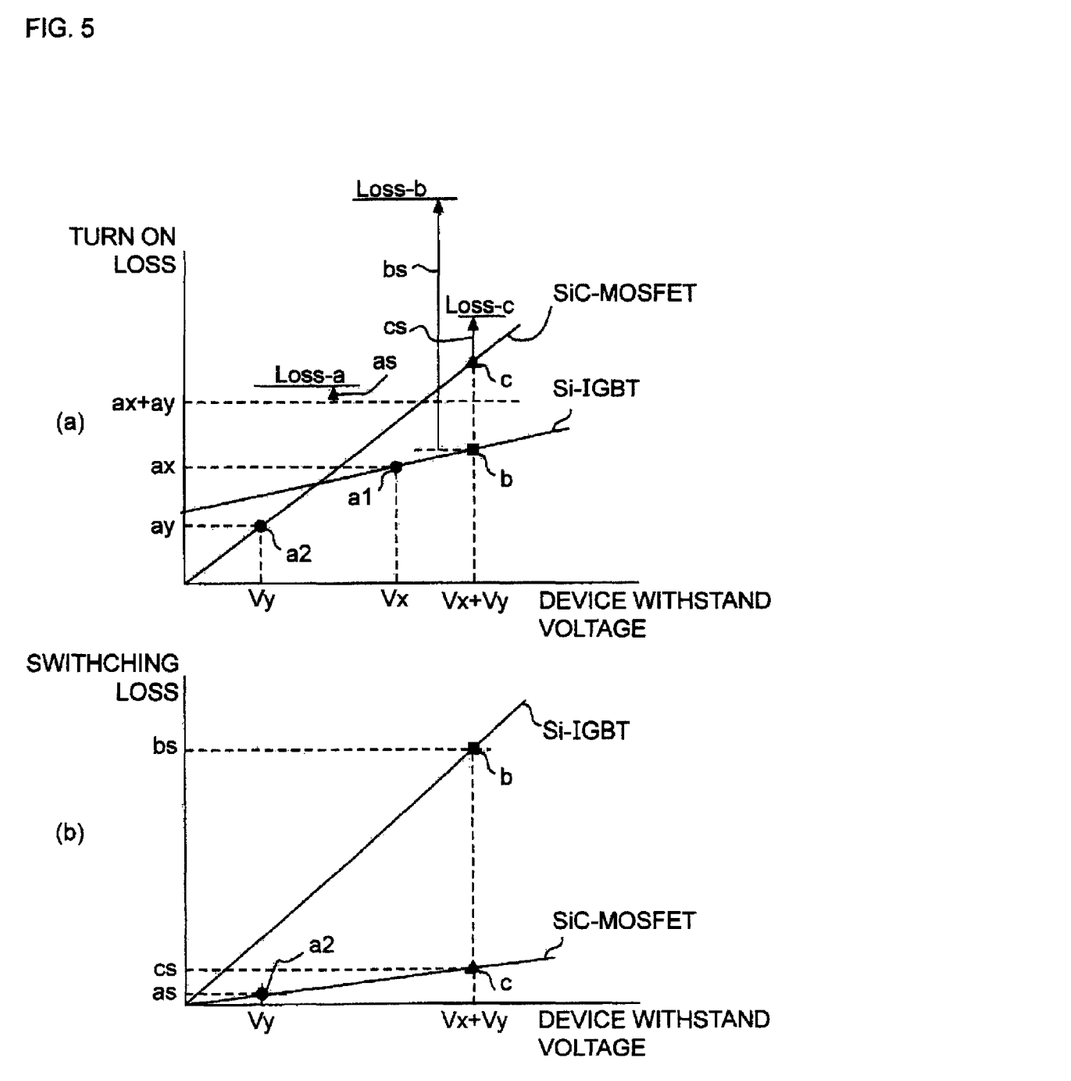
FIG. 5 presents charts depicting properties of a silicon insulated-gate bipolar transistor (Si IGBT) and a SiC metal oxide semiconductor field effect transistor (SiC MOSFET) according to the first embodiment of this invention.

FIGS. 5($a$) and 5($b$) are charts which depict the device properties of the Si IGBTs and the SiC MOSFETs, FIG. 5($a$) illustrating a relationship between the withstand voltage and turn-on loss of each device and FIG. 5($b$) illustrating a relationship between the withstand voltage and switching loss of each device.

Generally, a SiC material which is non-Si has such an excellent property that dielectric withstand voltage is high, so that the specific on-resistance of a SiC MOSFET takes a small value $\frac{1}{10}$ to $\frac{1}{50}$ times the specific on-resistance of a Si MOSFET. However, since a MOSFET is a unipolar device, the MOSFET allows a current to flow less easily compared to a bipolar device like an IGBT. Especially in the case of a SiC MOSFET which is used at over 1000 V, loss caused by the specific on-resistance thereof rapidly increases. FIG. 5($a$) indicates that the turn-on loss of the SiC MOSFET rapidly increases when the withstand voltage thereof increases, although the turn-on loss of the Si IGBT does not increase so much even when the withstand voltage thereof increases.

Also, one feature of a non-Si device is a high switching speed. SiC MOSFETs and SiC SBDs have switching speeds approximately $\frac{1}{10}$ to $\frac{1}{50}$ times or less those of Si IGBTs which are Si devices or positive/negative-type (pn) diodes. Therefore, non-Si devices produce extremely low switching losses even when switched at a high frequency. FIG. 5($b$) indicates that the SiC MOSFET produces an extremely low switching loss compared to the Si IGBT.

Because of the aforementioned properties, SiC MOSFETs and SiC SBDs are not suited for use in inverter circuits operated at a voltage exceeding 1000 V although suited to applications in inverters which perform high-frequency switching. This means that the SiC MOSFETs and SiC SBDs are suited to applications in a circuit which performs high-frequency switching at a voltage of 1000 V or less.

On the contrary, the Si IGBTs are not suited to applications involving switching operations performed at a high frequency because of low switching speeds although the Si IGBTs allow a current to flow easily and the turn-on losses of the Si IGBTs do not increase so much even when the withstand voltage thereof increases to a level over 1000 V since the Si IGBTs are bipolar devices. This means that the Si IGBTs are suited to applications in inverter circuits which perform low-frequency switching operations at a voltage exceeding 1000 V.

Referring to FIGS. 5(a) and 5(b), an assumption is made that the Si IGBTs 3 used in the first single-phase inverter 1 are Si IGBT devices a1 having a withstand voltage Vx and the SiC MOSFETs 6 used in the second single-phase inverter 2 are SiC MOSFET devices a2 having a withstand voltage Vy, wherein the withstand voltage Vx of the Si IGBT devices a1 exceeds a range of 1000 to 1200 V.

As a first comparative example, it is assumed that each individual high-frequency, high-voltage single-phase inverter is configured with Si IGBTs alone, the devices used in this example being Si IGBT devices b having a withstand voltage Vx+Vy. Also, as a second comparative example, it is assumed that each individual high-frequency, high-voltage single-phase inverter is configured with SiC MOSFETs alone, the devices used in this example being SiC MOSFET devices c having the withstand voltage Vx+Vy.

In this embodiment, the first single-phase inverter 1 which employs the Si IGBT devices a1 (Si IGBTs 3) and is provided with the first DC power supply 5 that supplies the voltage Vdc-main (=kVx) is operated at a low frequency. Since the Si IGBT devices a1 operate at the low frequency, the switching loss takes an extremely small value (ignored in the Figure). For this reason, a major part of the loss is turn-on loss ax so that the loss of the Si IGBT devices a1 becomes approximately equal to ax.

The second single-phase inverter 2 which employs the SiC MOSFET devices a2 (SiC MOSFETs 6) and is provided with the capacitor 8 that supplies the voltage Vdc-sub (=mVy) is operated at a high frequency. Switching loss as of the SiC MOSFET devices a2 is extremely small. The loss of the SiC MOSFET devices a2 becomes equal to the sum of turn-on loss ay and the switching loss as.

Here, k and m are the ratios of the inverter DC voltages to the respective withstand voltages. Generally, values from 0.5 to 0.8 are selected as k and m. Also, since the devices a1, a2 constitute the single-phase inverters 1, 2, respectively, a voltage equal to or lower than kVx is applied to the Si IGBT devices a1 while a voltage equal to or lower than mVy is applied to the SiC MOSFET devices a2.

If the power loss of the entire power converting apparatus is expressed by the sum of the turn-on losses and switching losses of the Si IGBT devices a1 and the SiC MOSFET devices a2, total loss Loss-a becomes equal to ax+ay+as.

In the first comparative example employing only the Si IGBT devices b having the withstand voltage Vx+Vy, switching loss bs is extremely large and loss Loss-b of the entire circuit to which the turn-on losses are added becomes larger than the loss Loss-a. Also, in the second comparative example employing only the SiC MOSFET devices c having the withstand voltage Vx+Vy, turn-on loss is extremely large and loss Loss-c of the entire circuit to which switching loss cs is added becomes larger than the loss Loss-a.

As discussed above, the power loss Loss-a of the power converting apparatus according to this embodiment is reduced to a level lower than the power losses Loss-b, Loss-c of the first and second comparative examples in which each individual high-frequency, high-voltage single-phase inverter is configured with Si IGBTs or SiC MOSFETs alone, respectively.

In this embodiment, the power converting apparatus is configured by combining the first single-phase inverter 1 which uses the Si IGBT devices a1 (Si IGBTs 3) having the high withstand voltage Vx exceeding 1000 V and is operated at a low frequency and the second single-phase inverter 2 which uses the SiC MOSFET devices a2 (SiC MOSFETs 6) having the relatively low withstand voltage Vy and is operated at a high frequency as thus far described. This configuration causes the turn-on losses of the Si IGBTs 3 to occupy a major part of overall turn-on losses and greatly lowers overall switching losses, thus reducing the ratio of the switching losses to an entire loss (i.e., turn-on losses+switching losses). Also, since the output of the power converting apparatus becomes equal to the sum of the outputs of the first and second single-phase inverters 1, 2, it is possible to lower the withstand voltage of each device by causing the individual single-phase inverters 1, 2 to produce separately determined output voltages, thereby reducing the overall turn-on losses. According to these aspects, the power converting apparatus can achieve a reduction in losses with high reliability and a resultant improvement in conversion efficiency.

Also, owing to the above-described combination of the first and second inverters 1, 2 configured with two types of devices having different properties, it is possible to produce high-frequency switching operation with lower losses and obtain an output voltage having a highly precise voltage waveform even with a circuit configuration operated at a high voltage exceeding 1000 V.

Incidentally, the sum ax+ay of the turn-on losses of the Si IGBT devices a1 and the SiC MOSFET devices a2 is set smaller than the turn-on loss of the SiC MOSFET devices c having the withstand voltage Vx+Vy as shown in FIG. 5(a). This makes it possible to obtain a loss reducing effect in a reliable fashion. Expressing the turn-on loss of the SiC MOSFET devices c having the withstand voltage Vx+Vy as cxy, this relationship can be expressed as ax+ay>cxy. Specifically, $$(ax+ay)/(Vx+Vy)>cxy/(Vx+Vy)$$

From the property of the SiC MOSFETs, $$cxy/(Vx+Vy)=ay/Vy$$

Thus, $$(ax+ay)/(Vx+Vy)>ay/Vy$$

In this inequality, an on-voltage corresponding to a voltage drop that occurs at a turn-on timing may be substituted for the turn-on loss and the DC voltages Vdc-main, Vdc-sub of the individual single-phase inverters 1, 2 may be substituted for the withstand voltages Vx, Vy, respectively. Thus, the inequality can be expressed as follows. Specifically, the ratio of the sum of on-voltages of the Si IGBT devices a1 and the SiC MOSFET devices a2 to (Vdc-main+Vdc-sub) is smaller than the ratio of the on-voltage of the SiC MOSFET devices a2 to Vdc-sub. It is possible to reliably obtain a loss reducing effect by configuring the individual single-phase inverters 1, 2 in the aforementioned manner.

Second Embodiment

Next, a second embodiment of the present invention is described with reference to the drawings.

Figure 6:
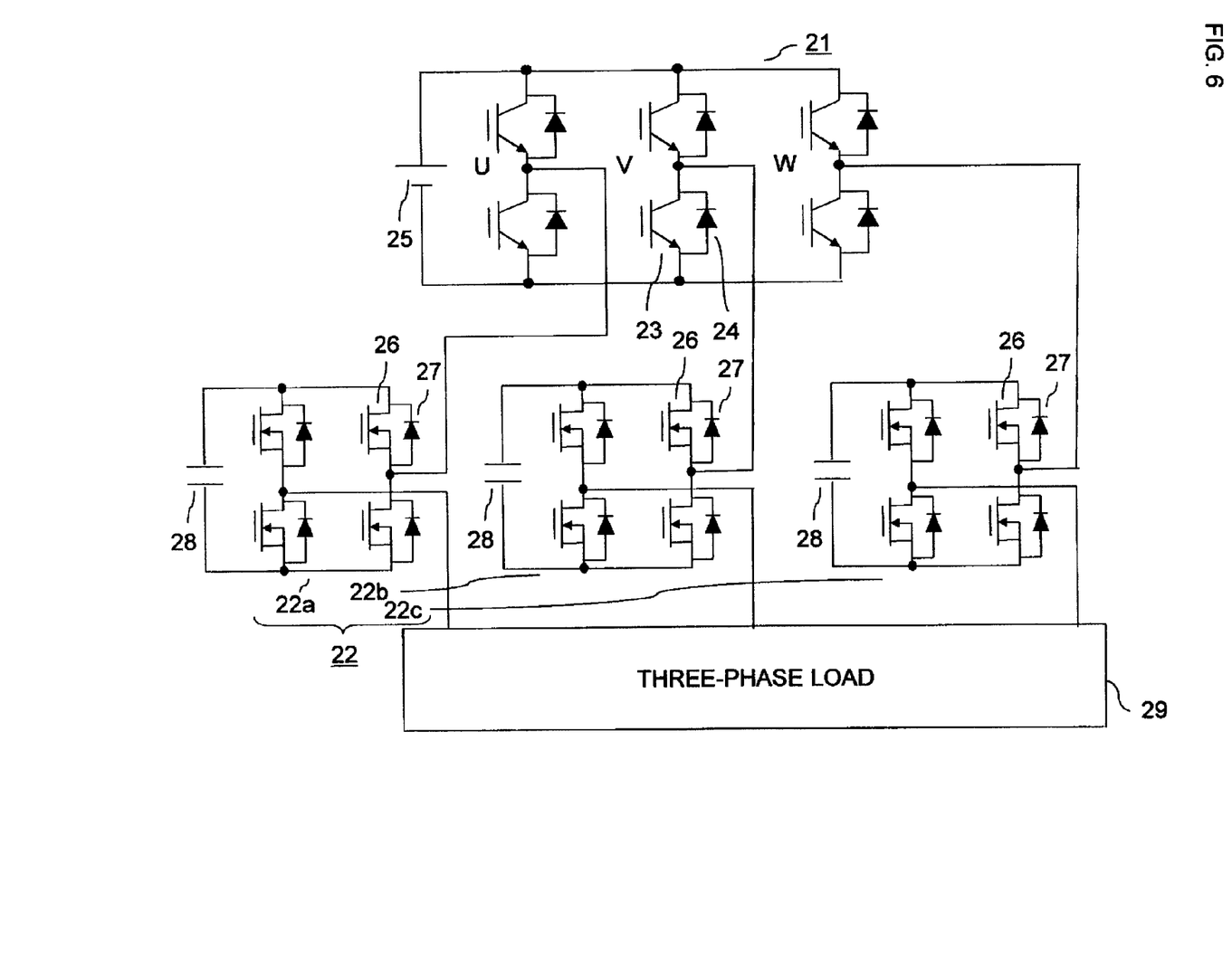
FIG. 6 is a diagram showing the configuration of a power converting apparatus according to a second embodiment of this invention.

FIG. 6 is a diagram showing the configuration of a power converting apparatus according to the second embodiment of this invention. As shown in FIG. 6, the power converting apparatus in which AC side output terminals of single-phase inverters 22a, 22b, 22c are series-connected to AC output lines of individual phases of a main inverter (first inverter circuit) made up of a three-phase inverter 21, respectively, supplies AC power to a three-phase load 29.

Used in the three-phase inverter 21 are Si-based devices. In this case, the three-phase inverter 21 is configured with Si IGBTs 23 constituting a plurality of Si semiconductor switching devices with which Si diodes 24 are individually connected in reverse parallel and a first DC power supply 25 serving as a first DC voltage source provided in a DC input portion. The three-phase inverter 21 thus configured converts DC power fed from the first DC power supply 25 into AC power and outputs the latter. This three-phase inverter 21 works as an energy source for the three-phase load 29.

Used in a sub-inverter 22 (second inverter circuit) including the three single-phase inverters 22a, 22b, 22c are devices made of SiC or GaN, for example, which are non-Si semiconductor materials having wider band gaps than silicon. In this case, each of the single-phase inverters 22a, 22b, 22c is configured with SiC MOSFETs 26 constituting a plurality of non-Si semiconductor switching devices with which SiC SBDs 27 are individually connected in reverse parallel and a capacitor 28 serving as a second DC voltage source provided in a DC input portion. Each of the single-phase inverters 22a, 22b, 22c thus configured converts DC power fed from the capacitor 28 into AC power and outputs the latter. Since the DC input portion of each of the single-phase inverters 22a, 22b, 22c is provided with the capacitor 8 alone in this case, the single-phase inverters 22a, 22b, 22c are controlled such that the amounts of electricity charged into and discharged from the relevant capacitor 28 are balanced, or such that an average power burden born by each of the single-phase inverters 22a-22c becomes zero.

It is to be noted that a second DC power supply 10 may be used as the second DC voltage source as shown in FIG. 2 and, in this case, each of the single-phase inverters 22a-22c also works as an energy source for the three-phase load 29.

Voltage Vdc-main of the first DC power supply 25 of the three-phase inverter 21 is a high voltage exceeding 1000V, for example, and this voltage is set higher than voltage Vdc-sub of the capacitor 28 of each of the single-phase inverters 22a-22c.

Since the single-phase inverters 22a, 22b, 22c are connected to the AC output lines of the respective phases of the three-phase inverter 21, the voltages generated by the three-phase inverter 21 and the single-phase inverters 22a, 22b, 22c are combined for the respective phases and three-phase AC power having a prescribed voltage waveform is supplied to the three-phase load 29. In this case, it is possible to generate necessary voltages as voltage values obtained by adding the voltages of two of the single-phase inverters 22a-22c to the voltage of the three-phase inverter 21 are made equal to or higher than a necessary maximum line-to-line voltage.

Specifically, the voltage Vdc-main of the first DC power supply 25 and the voltage Vdc-sub of each capacitor 28 are determined to satisfy:

$Vdc$-main$>Vdc$-sub $(Vdc$-main$+Vdc$-sub$)\times 2 \geq$ maximum load voltage(maximum line-to-line voltage)

Also, as is the case with the foregoing first embodiment, the main inverter (three-phase inverter 21) employs Si IGBT devices a1 having a high withstand voltage Vx exceeding 1000 V as the Si IGBTs 23 and is operated by low-frequency switching. On the other hand, each of the single-phase inverters 22a-22c of the sub-inverter 22 employs SiC MOSFET devices a2 having a relatively low withstand voltage Vy as the SiC MOSFETs 26 and is operated by high-frequency PWM switching.

This enables the power converting apparatus to achieve a reduction in losses with high reliability and a resultant improvement in conversion efficiency in the same fashion as in the foregoing first embodiment.

Also, owing to the above-described combination of the first and second inverters 1, 2 configured with two types of devices having different properties, it is possible to produce high-frequency switching operation with lower losses and obtain output voltages having a highly precise voltage waveform even with a circuit configuration operated at a high voltage exceeding 1000 V.

It is possible to reliably obtain a loss reducing effect in this embodiment as well by configuring the three-phase inverter 21 and the sub-inverter 22 in such a manner that the ratio of the sum of on-voltages of the Si IGBTs 23 and the SiC MOSFETs 26 to (Vdc-main+Vdc-sub) is smaller than the ratio of the on-voltage of the SiC MOSFETs 26 to Vdc-sub.

Third Embodiment

Next, a third embodiment of the present invention is described with reference to the drawings.

Figure 7:
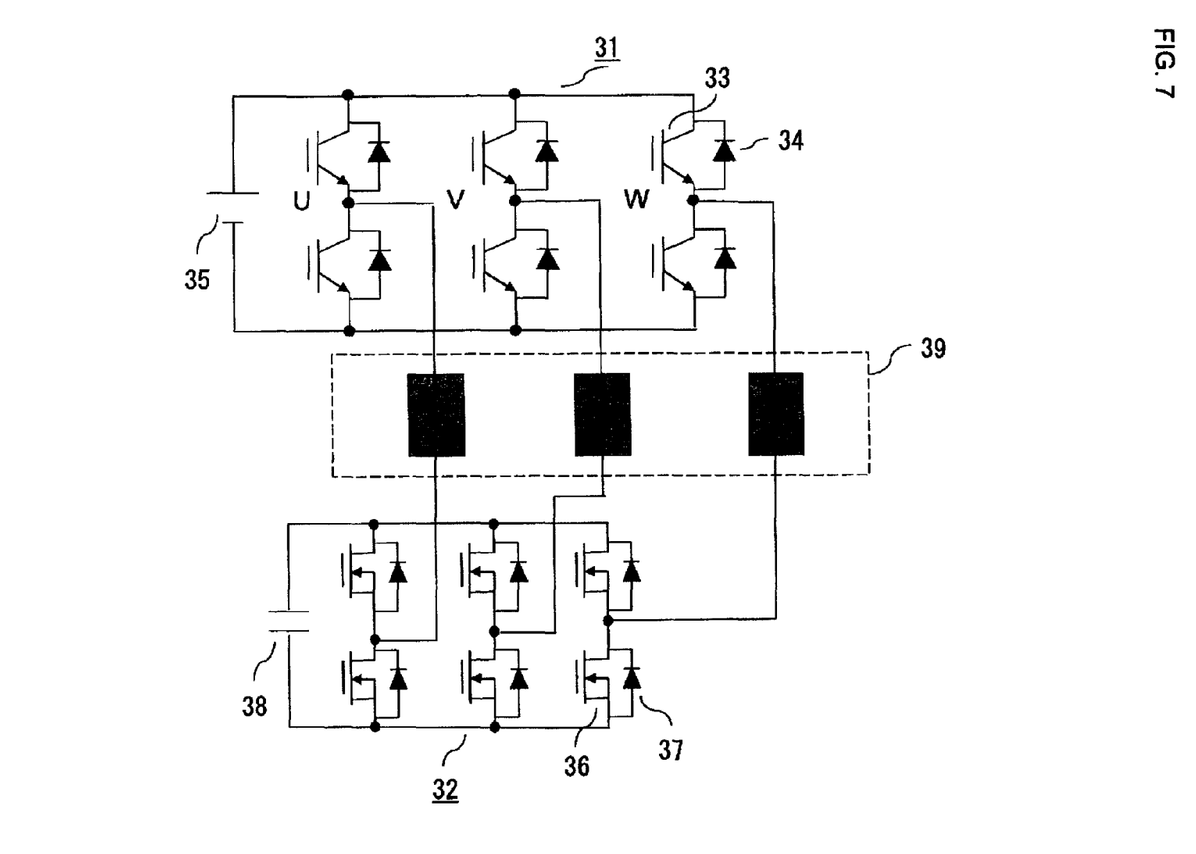
FIG. 7 is a diagram showing the configuration of a power converting apparatus according to a third embodiment of this invention.

FIG. 7 is a diagram showing the configuration of a power converting apparatus according to the third embodiment of this invention. As shown in FIG. 7, the power converting apparatus including a main inverter (first inverter circuit) made up of a first single-phase inverter 31 and a sub-inverter (second inverter circuit) made up of a second single-phase inverter 32 supplies AC power to a three-phase load 39. The three-phase load 39 is configured to include, for example, coiled loads provided independently for individual phases that are separated from one another. Also, AC output lines for the individual phases of the first three-phase inverter 31 are series-connected to AC side output terminals for the individual phases of the second three-phase inverter 32 through the respective phases of the three-phase load 39. This means that the first and second three-phase inverters 31, 32 supply electric power to the three-phase load 39 from both sides thereof.

Used in the first three-phase inverter 31 are Si-based devices. In this case, the first three-phase inverter 31 is configured with Si IGBTs 33 constituting a plurality of Si semiconductor switching devices with which Si diodes 34 are individually connected in reverse parallel and a first DC power supply 35 serving as a first DC voltage source provided in a DC input portion. The first three-phase inverter 31 thus configured converts DC power fed from the first DC power supply 35 into AC power and outputs the latter. This first three-phase inverter 31 works as an energy source for the three-phase load 39.

Used in the second three-phase inverter 32 are devices made of SiC or GaN, for example, which are non-Si semiconductor materials having wider band gaps than silicon. In this case, the second three-phase inverter 32 is configured with SiC MOSFETs 36 constituting a plurality of non-Si semiconductor switching devices with which SiC SBDs 37 are individually connected in reverse parallel and a capacitor 38 serving as a second DC voltage source provided in a DC input portion. The second three-phase inverter 32 thus configured converts DC power fed from the capacitor 38 into AC power and outputs the latter. Since the DC input portion of the second three-phase inverter 32 is provided with the capacitor 38 alone in this case, the second three-phase inverter 32 is controlled such that the amounts of electricity charged into and discharged from the capacitor 38 are balanced, or such that an average power burden born by the second three-phase inverter 32 becomes zero.

It is to be noted that a second DC power supply 10 may be used as the second DC voltage source as shown in FIG. 2 and, in this case, the second three-phase inverter 32 also works as an energy source for the three-phase load 39.

Voltage Vdc-main of the first DC power supply 35 of the first three-phase inverter 31 is a high voltage exceeding 1000 V, for example, and this voltage is set higher than voltage Vdc-sub of the capacitor 38 of the second three-phase inverter 32.

The voltages generated by the first three-phase inverter 31 and the second three-phase inverter 32 are combined for the individual phases and three-phase AC power having a prescribed voltage waveform is supplied to the three-phase load 39. In this case, it is possible to generate necessary voltages as voltage values obtained by adding the voltages of the second three-phase inverter 32 to the respective voltages of the first three-phase inverter 31 are made equal to or higher than a necessary maximum line-to-line voltage.

Specifically, the voltage Vdc-main of the first DC power supply 35 and the voltage Vdc-sub of the capacitor 38 are determined to satisfy:

$$Vdc\text{-main} > Vdc\text{-sub}$$

$$(Vdc\text{-main} + Vdc\text{-sub}) \geq \text{maximum load voltage(maximum line-to-line voltage)}$$

Also, as is the case with the foregoing first embodiment, the main inverter (first three-phase inverter 31) employs Si IGBT devices a1 having a high withstand voltage Vx exceeding 1000 V as the Si IGBTs 33 and is operated by low-frequency switching. On the other hand, the sub-inverter (second three-phase inverter 32) employs SiC MOSFET devices a2 having a relatively low withstand voltage Vy as the SiC MOSFETs 36 and is operated by high-frequency PWM switching.

This enables the power converting apparatus to achieve a reduction in losses with high reliability and a resultant improvement in conversion efficiency in the same fashion as in the foregoing first embodiment.

Also, owing to the above-described combination of the first and second three-phase inverters 31, 32 configured with two types of devices having different properties, it is possible to produce high-frequency switching operation with lower losses and obtain output voltages having a highly precise voltage waveform even with a circuit configuration operated at a high voltage exceeding 1000 V.

It is possible to reliably obtain a loss reducing effect in this embodiment as well by configuring the first and second three-phase inverters 31, 32 in such a manner that the ratio of the sum of on-voltages of the Si IGBTs 33 and the SiC MOSFETs 36 to (Vdc-main+Vdc-sub) is smaller than the ratio of the on-voltage of the SiC MOSFETs 36 to Vdc-sub.

Also, while the three-phase power converting apparatus has been described in the present third embodiment, it is possible to substitute single-phase inverters for the first and second three-phase inverters 31, 32 and a single-phase load for the three-phase load 39, regarding the individual phases as being independent of one another. Specifically, AC side output terminals of the single-phase inverter that serves as a main inverter may be connected to AC side output terminals of the single-phase inverter that serves as a sub-inverter through the single-phase load so that electric power is supplied to the single-phase load from both sides thereof. It is possible to obtain the same advantageous effect in this case as well by using Si IGBTs having a high withstand voltage Vx exceeding 1000 V in the main inverter and operating the same by low-frequency switching and using SiC MOSFETs having a relatively low withstand voltage Vy in the sub-inverter and operating the same by high-frequency PWM switching.

In the foregoing first to third embodiments, the main inverter (first inverter circuit) and the sub-inverter (second inverter circuit) each include series-connected units configured with two series-connected semiconductor switching devices with which diodes are individually connected in reverse parallel. Each series-connected unit configured with two series-connected SiC MOSFETs is operated by high-frequency PWM switching in the sub-inverter, wherein if one of the SiC MOSFETs is turned off, the reverse-parallel-connected diode of the other one of the SiC MOSFETs is brought to an ON state. The aforementioned other one of the SiC MOSFETs is brought to the ON state at this time, that is, during a period from a point of completion of turning off of the aforementioned one of the SiC MOSFETs to a point immediately preceding the beginning of turning on thereof. As the MOSFETs are conductible bidirectionally when set to the ON state, a current flows in either of the aforementioned other one of the SiC MOSFETs and the reverse-parallel-connected diode. For this reason, the on-voltage drops, additionally making it possible to reduce turn-on losses.

Furthermore, there is formed a parasitic diode (not shown) inside each MOSFET, wherein the parasitic diode is connected in the same direction as each SiC SBD of FIG. 1. Therefore, when MOSFETs are used as the semiconductor switching devices within the main inverter or the sub-inverter, it is possible to eliminate the reverse-parallel-connected diodes like SiC SBDs by using parasitic diodes instead of the reverse-parallel-connected diodes. This would make it possible to reduce cost needed for the reverse-parallel-connected diodes as well as the mounting area.

Also, while the main inverter and the sub-inverter are such that the former uses a higher DC voltage and yet a lower switching frequency than the latter in the foregoing first to third embodiments, the main inverter and the sub-inverter may be such that the former uses the same switching frequency as and a higher DC voltage than the latter, or alternatively, the former uses the same DC voltage as and a lower switching frequency than the latter. This would also make it possible to obtain an overall loss reducing effect.

Also, while the foregoing first to third embodiments illustrate a case in which the semiconductor switching devices and the diodes provided in the sub-inverter are both non-Si devices like SiC devices, for example, this configuration may be modified such that only the semiconductor switching devices are non-Si devices.

Furthermore, the configuration may be modified such that only the diodes within the sub-inverter are SiC SBDs, for example, which are non-Si devices. It is possible to significantly reduce the turn-on losses of the Si semiconductor switching devices within the sub-inverter as well as losses of the SiC SBDs at the time of recovery thereof in this case as well, so that this arrangement produces a greater loss reducing effect compared to a case where the semiconductor switching devices and the diodes within the sub-inverter are both configured with Si devices.

Fourth Embodiment

Next, a fourth embodiment of the present invention is described.

While the foregoing first to third embodiments use Si IGBT and SiC MOSFET devices having properties as shown in FIGS. 5(a) and 5(b), the properties of each SiC MOSFET can be varied by increasing or decreasing injected carriers; it is known that it is possible to lower the on-voltage, or turn-on loss, by decreasing the switching speed.

Figure 8:
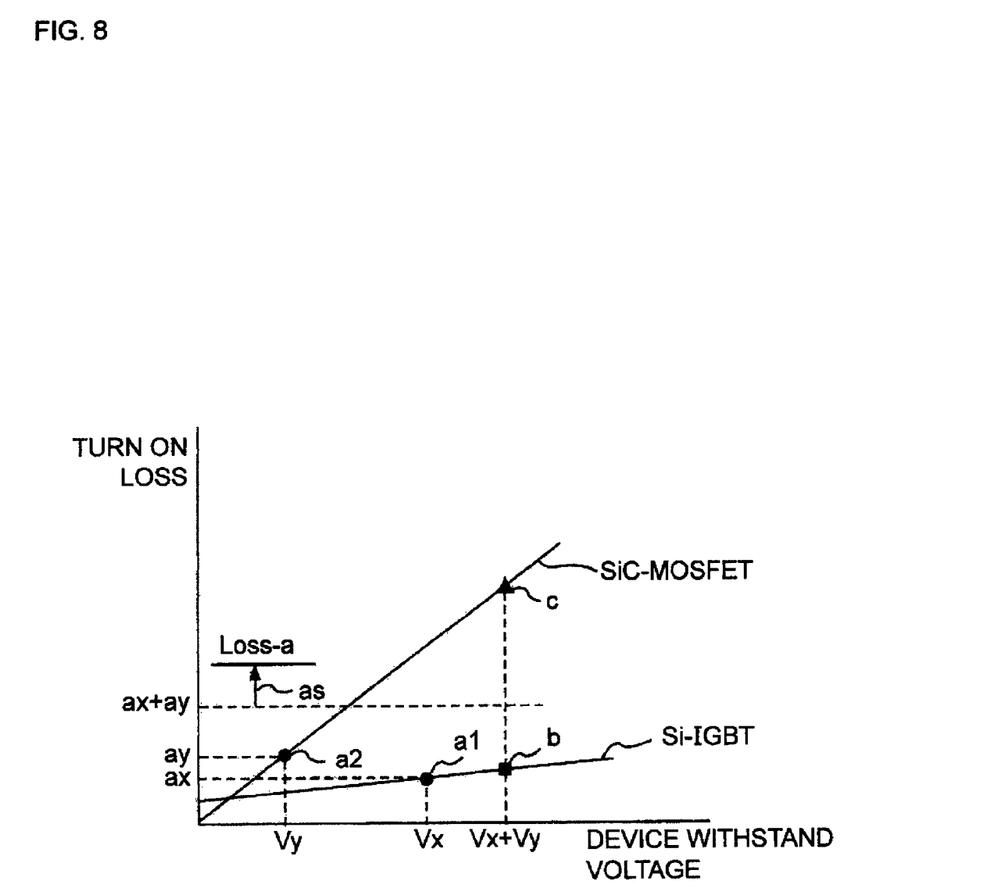
FIG. 8 is a chart depicting properties of a Si IGBT and a SiC MOSFET according to a fourth embodiment of this invention.

In this embodiment, power converting apparatuses like those shown in the foregoing first to third embodiments are configured by using Si IGBTs having a device configuration in which the on-voltage is lowered by decreasing the switching speed than in the foregoing first embodiment and SiC MOSFETs which are the same as used in the foregoing first embodiment. FIG. 8 is a chart depicting device properties of the Si IGBTs and the SiC MOSFETs used in this embodiment, illustrating a relationship between the withstand voltage and turn-on loss of each device.

An assumption is made that the Si IGBTs 3, 23, 33 used respectively in the main inverters 1, 21, 31 are Si IGBT devices a1 having a withstand voltage Vx and the SiC MOSFETs 6, 26, 36 used respectively in the sub-inverters 2, 22, 32 are SiC MOSFET devices a2 having a withstand voltage Vy, wherein the withstand voltage Vx of the Si IGBT devices a1 exceeds a range of 1000 to 1200 V.

As a first comparative example, it is assumed that each individual high-frequency, high-voltage single-phase inverter is configured with Si IGBTs alone wherein the devices used are Si IGBT devices b having a withstand voltage Vx+Vy. Also, as a second comparative example, it is assumed that each individual high-frequency, high-voltage single-phase inverter is configured with SiC MOSFETs alone wherein the devices used are SiC MOSFET devices c having the withstand voltage Vx+Vy.

The main inverters 1, 21, 31 using the Si IGBT devices a1 are operated at a low frequency, the sub-inverters 2, 22, 32 using the SiC MOSFET devices a2 are operated at a high frequency, and electric power obtained by combinations of outputs of the main inverters 1, 21, 31 and the sub-inverters 2, 22, 32 is supplied to the loads 9, 29, 39, respectively, in this embodiment as well.

The Si IGBT devices a1 are configured in such a way that the turn-on loss ax of the Si IGBT devices a1 becomes smaller than the turn-on loss ay of the SiC MOSFET devices a2 as depicted in FIG. 8. In this case, overall turn-on loss ax+ay is greatly reduced compared to the foregoing first embodiment because the turn-on loss ax of the Si IGBT devices a1 is greatly reduced. Although the switching speed of the Si IGBT devices a1 decreases, causing an increase in switching loss at this time, an influence of the amount of the increase is insignificant as the Si IGBT devices a1 are switched at a low frequency and, thus, the amount of increase in overall switching loss as is also relatively small. Consequently, it is possible to reduce the total loss Loss-a which is the sum ax+ay+as of the turn-on losses and switching losses of the Si IGBT devices a1 and the SiC MOSFET devices a2 compared to the foregoing first embodiment.

In the first comparative example employing only the Si IGBT devices b having the withstand voltage Vx+Vy, switching loss caused by high-frequency operation is extremely large and loss of the entire circuit to which the turn-on losses are added becomes larger than the loss Loss-a in this case as well. Also, in the second comparative example employing only the SIC MOSFET devices c having the withstand voltage Vx+Vy, turn-on loss is extremely large and loss of the entire circuit to which the switching loss is added becomes larger than the loss Loss-a.

While the ratio of the overall switching loss to an entire loss (i.e., turn-on losses+switching losses) is small in the foregoing first embodiment, the ratio of the overall switching loss to the entire loss is increased by reducing the turn-on loss ax of the Si IGBTs a1 as in the present fourth embodiment. It is generally said that an approach to the most efficient design of device properties is to design the same in such a way that the turn-on loss and switching loss are equal in value. Also, in the case of high-voltage devices, switching speeds are extremely low and these devices are used in a range in which the switching loss is one to two times as large as the turn-on loss in many cases.

For this reason, it is anticipated that an optimum point will be obtained for the entirety of a power converting apparatus if the switching speed and on-voltage of Si IGBTs are lowered and the Si IGBT devices are designed such that the overall switching loss is one to two times as large as the overall turn-on loss.

Fifth Embodiment

Next, a fifth embodiment of the present invention is described.

Figure 9:
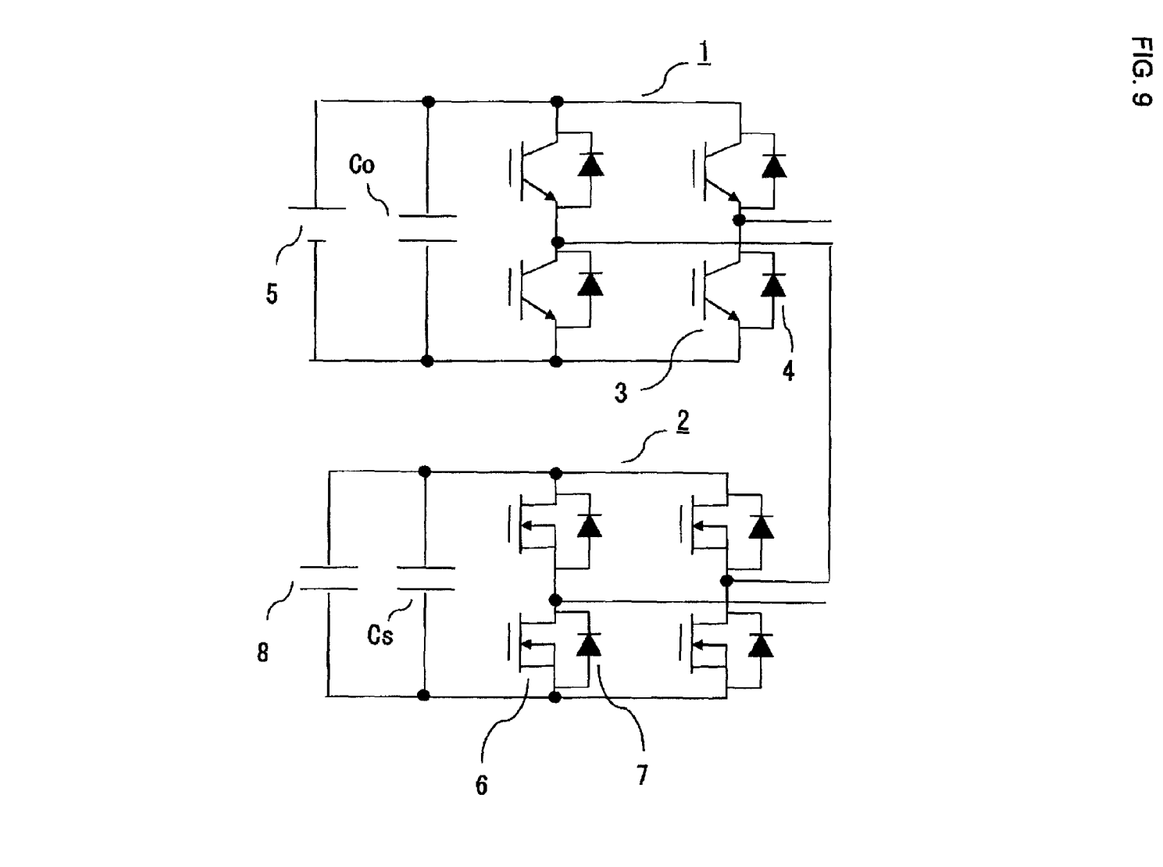
FIG. 9 is a diagram showing the configuration of a power converting apparatus according to a fifth embodiment of this invention.

In the present fifth embodiment, capacitors Co, Cs are connected between the first DC power supply 5 or the capacitor 8 which are respectively the DC voltage sources of the first and second single-phase inverters 1, 2 described in the foregoing first embodiment and individual arms as shown in FIG. 9.

Since the second single-phase inverter 2 is operated at a high frequency, it is necessary to increase the switching speed of each device for reducing switching losses. If wiring has a large inductance Ls, there is a risk of device breakdown owing to a surge voltage induced by Ls·di/dt and, therefore, it is necessary to decrease the inductance Ls of the wiring. For this reason, a capacitor used as the capacitor Cs connected between the capacitor 8 of the second single-phase inverter 2 and the individual arms should be of a type having a small inductance. Also, it is desirable to select a capacitor having not only a small inductance but also a small impedance including a resistance component.

On the other hand, it is not necessary to increase the switching speed of the first single-phase inverter 1 which is operated at a low frequency, so that there is no need to take into consideration adverse effects of surge voltages. For this reason, it is not necessary that, unlike the capacitor Cs, the capacitor Co connected between the first DC power supply 5 of the first single-phase inverter 1 and the individual arms be of a type having small inductance and impedance and, therefore, it is possible to use an inexpensive capacitor.

It should be noted that, even without lowering the inductance and impedance of the capacitor Cs itself, it is possible to suppress the surge voltage by lowering the inductance and impedance of the entirety of paths from the capacitor Cs to the individual arms. Specifically, this is achieved by making the inductance and impedance of the paths from the capacitor Cs to the individual arms smaller than the inductance and impedance of paths from the capacitor Co to the individual arms.

It is possible to produce a power converting apparatus having a highly reliable, low-cost circuit configuration by making the inductance and impedance of the wiring from the capacitor 8 of the second single-phase inverter 2 to the individual arms smaller than the inductance and impedance of the wiring from the first DC power supply 5 of the first single-phase inverter 1 to the individual arms as described above.

It is to be noted that this embodiment is applicable to the power converting apparatuses having the circuit configurations according to the foregoing second and third embodiments as well. Specifically, it is possible to produce power converting apparatuses having a highly reliable, low-cost circuit configuration by making the inductance and impedance of the wiring from the capacitor 28, 38 of the sub-inverter 22, 32 to the individual arms smaller than the inductance and impedance of the wiring from the first DC power supply 25, 35 of the main inverter 21, 31 to the individual arms.

Sixth Embodiment

Next, a sixth embodiment of the present invention is described.

Figure 10:
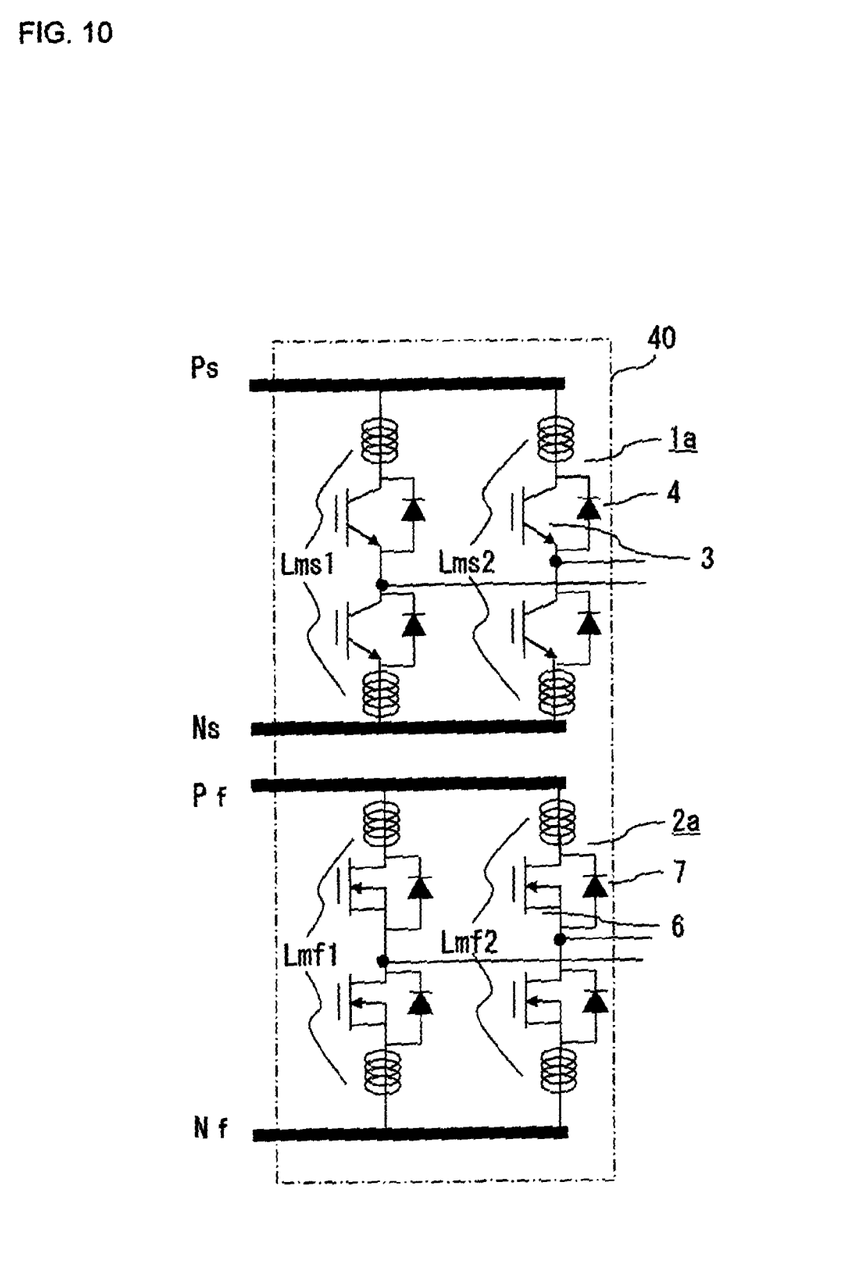
FIG. 10 is a diagram showing the configuration of a module according to a sixth embodiment of this invention.

In the present sixth embodiment, a Si device section 1a constituting the individual arms of the first single-phase inverter 1 according to the foregoing first embodiment and a SiC device section 2a constituting the individual arms of the second single-phase inverter 2 are accommodated in one module 40 as shown in FIG. 10.

The Si device section 1a of the first single-phase inverter 1 is configured with Si IGBTs 3 and Si diodes 4 while the SiC device section 2a of the second single-phase inverter 2 is configured with SiC MOSFETs 6 and SiC SBDs 7. Ps and Ns are DC bus lines of the first single-phase inverter 1 and Pf and Nf are DC bus lines of the second single-phase inverter 2. Also, designated by Lms1 and Lms2 are wiring inductances of two arms of the Si device section 1a within the module and designated by Lmf1 and Lmf2 are wiring inductances of two arms of the SiC device section 2a.

Since the SiC device section 2a of the second single-phase inverter 2 is operated at a high frequency, it is necessary to suppress surge voltages occurring at switching points by decreasing the wiring inductances Lmf1, Lmf2. On the other hand, it is not necessary to increase the switching speed of the Si device section 1a of the first single-phase inverter 1 which is operated at a low frequency and, thus, there is no need to take into consideration adverse effects of surge voltages.

In this embodiment, individual devices and wires are arranged in a manner that satisfies Lms1>Lmf1 and Lms2>Lmf2. This makes it possible to decrease the wiring inductances Lmf1, Lmf2 of the SiC device section 2a with a low-cost circuit configuration and thus produce a power converting apparatus having high reliability with reduced surge voltages.

Although devices made of different materials are normally not accommodated in a common module, the Si device section 1a and the SiC device section 2a are reliably accommodated in the single module 40 in this embodiment under conditions where the wiring inductances satisfy relationships expressed by Lms1>Lmf1 and Lms2>Lmf2 as mentioned above. This makes it possible to achieve a further reduction in size of the power converting apparatus.

It is to be noted that this embodiment is applicable to the power converting apparatuses having the circuit configurations according to the foregoing second and third embodiments as well. Specifically, the Si device section of the main inverter 21, 31 and the SiC device section of the sub-inverter 22, 32 may be accommodated in a single module with the wiring inductance of the SiC device section made smaller than the wiring inductance of the Si device section.

Figure 11:
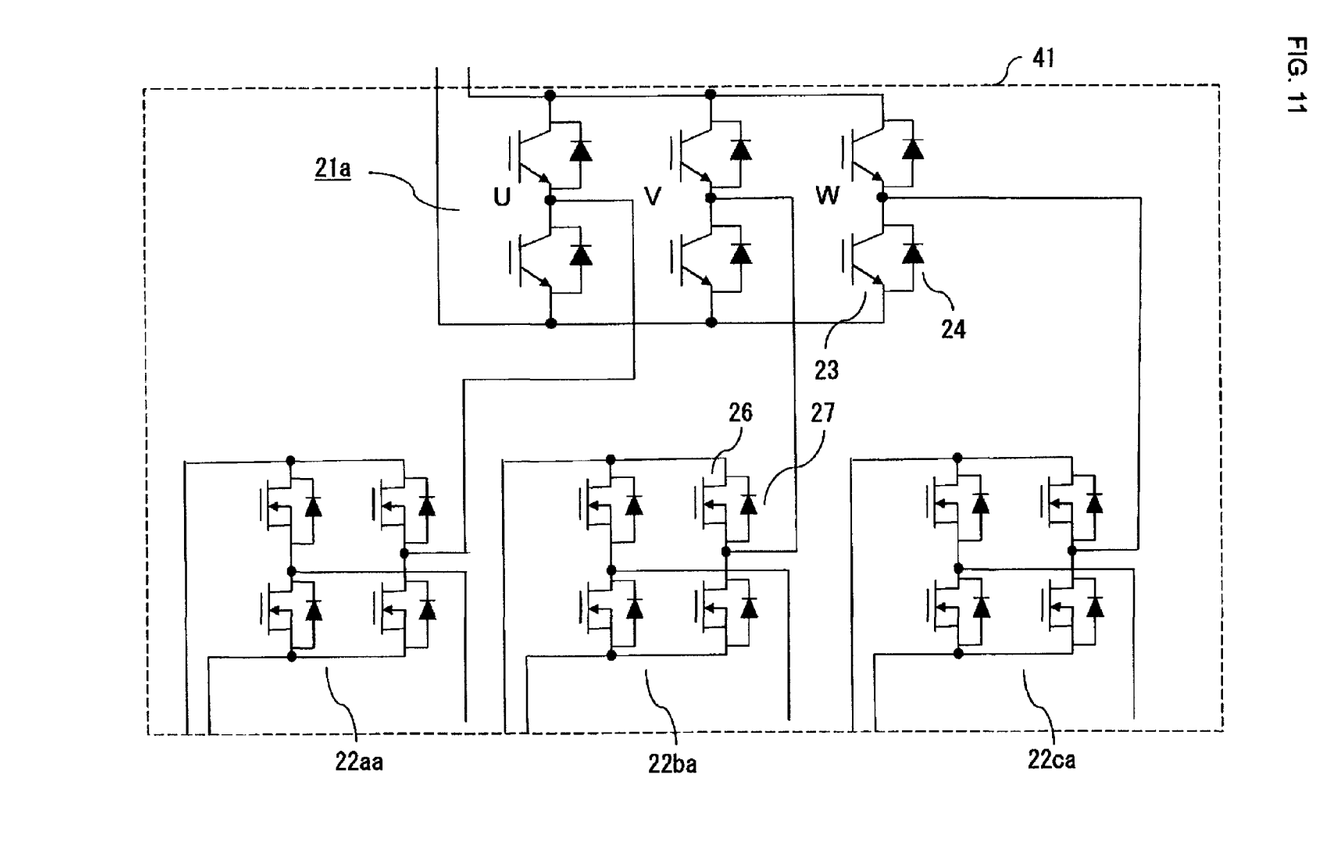
FIG. 11 is a diagram showing the configuration of a three-phase hybrid module according to a variation of the sixth embodiment of this invention.

FIG. 11 shows what is obtained by applying the sixth embodiment to the foregoing second embodiment. As depicted in the Figure, a Si device section 21a of the main inverter 21 and SiC device sections 22aa, 22ba, 22ca of respective single-phase inverters 22a, 22b, 22c are accommodated in a three-phase hybrid module 41 which is a single module.

Even when the sixth embodiment is applied to the power converting apparatus having the circuit configuration according to the foregoing second or third embodiment, it is possible to produce a power converting apparatus having a low-cost circuit configuration and high reliability with reduced surge voltages, yet achieving a further reduction in size of the power converting apparatus.

It should also be mentioned that, although IGBTs are used as the Si semiconductor switching devices in the above-discussed individual embodiments, it is possible to use gate commutated turn-off thyristors (GCTs) or bipolar transistors which are bipolar devices, yet achieving the same advantages.

The invention claimed is:

1. A power converting apparatus comprising:
   a first inverter circuit provided with a first DC voltage source and a plurality of Si semiconductor switching devices; and
   a second inverter circuit provided with a second DC voltage source and a plurality of semiconductor switching devices;
   wherein:
   all of the semiconductor switching devices of said first inverter are Si semiconductor switching devices, and all of the semiconductor switching devices of said second inverter are non-Si semiconductor switching devices made of a semiconductor material having a wider band gap than silicon,
   said first DC voltage source has a voltage higher than a voltage of said second DC voltage source and a switching frequency at which said first inverter circuit is driven is lower than a switching frequency at which said second inverter circuit is driven, and
   AC side output terminals of said first inverter circuit and AC side output terminals of said second inverter circuit are connected in series, and AC power having a prescribed voltage waveform obtained by combining outputs of said first and second inverter circuits is supplied to a load.

2. The power converting apparatus as recited in claim 1 wherein said first inverter circuit and said second inverter circuit are configured individually with single-phase inverters.

3. The power converting apparatus as recited in claim 1 wherein said first inverter circuit is configured with an n-phase inverter while said second inverter circuit is configured with at least n number of single-phase inverters, and wherein the AC side output terminals of said individual single-phase inverters of said second inverter circuit are connected in series to AC output lines of individual phases of said first inverter circuit, the outputs of said first and second inverter circuits are combined for the individual phases, and n-phase AC power having the prescribed voltage waveform is supplied to an n-phase load.

4. The power converting apparatus as recited in claim 1 wherein the AC side output terminals of said first inverter circuit and the AC side output terminals of said second inverter circuit are connected in series with said load disposed in between, and said first inverter circuit and said second inverter circuit supply the AC power to said load from both sides thereof.

5. The power converting apparatus as recited in claim 1 wherein the ratio of the sum of two kinds of on-voltages of said Si semiconductor switching devices in said first inverter circuit and said non-Si semiconductor switching devices in said second inverter circuit to the sum of DC voltages of said first DC voltage source and said second DC voltage source is smaller than the ratio of the on-voltage of said non-Si semiconductor switching devices to the DC voltage of said second DC voltage source.

6. The power converting apparatus as recited in claim 1 wherein on-voltage of said Si semiconductor switching devices in said first inverter circuit is made lower than on-voltage of said non-Si semiconductor switching devices in said second inverter circuit.

7. The power converting apparatus as recited in claim 1 wherein said Si semiconductor switching devices in said first inverter circuit are configured to have a reduced switching speed and a lowered on-voltage so that the sum of switching losses of said first and second inverter circuits becomes one to two times as large as the sum of conduction losses.

8. The power converting apparatus as recited in claim 1 wherein withstand voltage of said Si semiconductor switching devices in said first inverter circuit is at least 1000 V.

9. The power converting apparatus as recited in claim 1 wherein one of an IGBT, a GCT and a bipolar transistor is used as each of said Si semiconductor switching devices in said first inverter circuit.

10. The power converting apparatus as recited in claim 1 wherein said second inverter circuit has at least one pair of series-connected units each including two non-Si semiconductor switching devices, and wherein, during a period from a point of completion of turning off of one of said non-Si semiconductor switching devices of each of said series-connected units to a point immediately preceding a next turn-on timing thereof, the other one of said non-Si semiconductor switching devices is turned on.

11. The power converting apparatus as recited in claim 1 wherein SiC MOSFETs are used as said individual non-Si semiconductor switching devices in said second inverter circuit.

12. The power converting apparatus as recited in claim 1 wherein said second inverter circuit includes said plurality of non-Si semiconductor switching devices and a plurality of non-Si diodes.

13. The power converting apparatus as recited in claim 12 wherein said plurality of non-Si diodes are SiC Schottky barrier diodes.

14. The power converting apparatus as recited in claim 1 wherein inductance of wiring from said second DC voltage source of said second inverter circuit to each arm of said second inverter circuit is smaller than inductance of wiring from said first DC voltage source of said first inverter circuit to each arm of said first inverter circuit.

15. The power converting apparatus as recited in claim 1 wherein said Si semiconductor switching devices in said first inverter circuit and said non-Si semiconductor switching devices in said second inverter circuit are accommodated in a common module.

16. The power converting apparatus as recited in claim 1 wherein only said second inverter circuit among said first and second inverter circuits is controlled by high-frequency PWM operation.

* * * * *